July 3, 1934.   H. KLAUCKE   1,965,145
FLEXIBLE COUPLING
Filed April 4, 1934
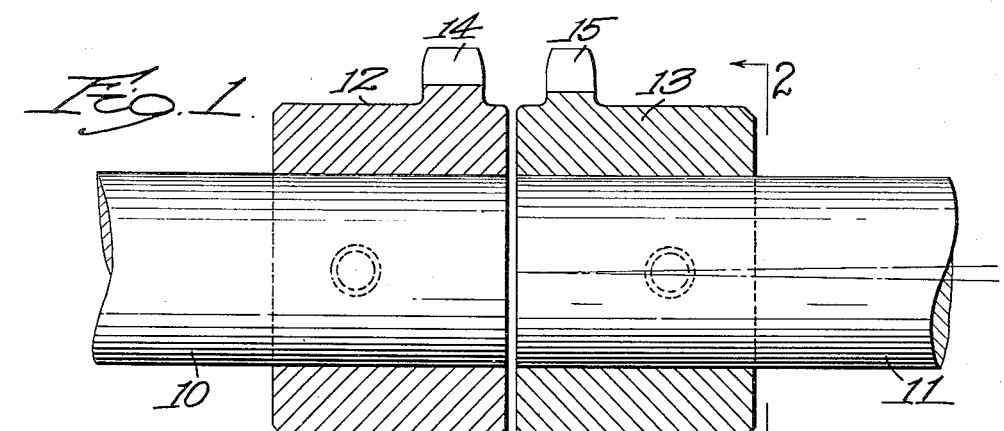
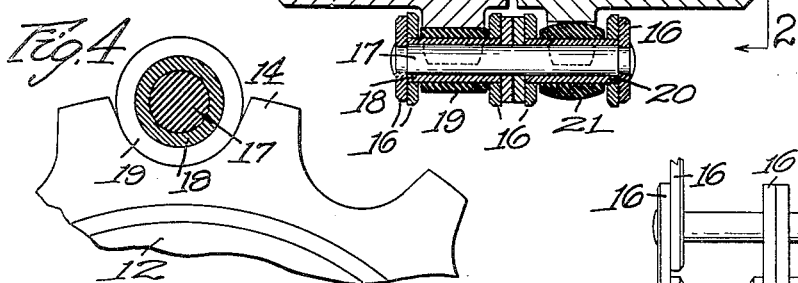
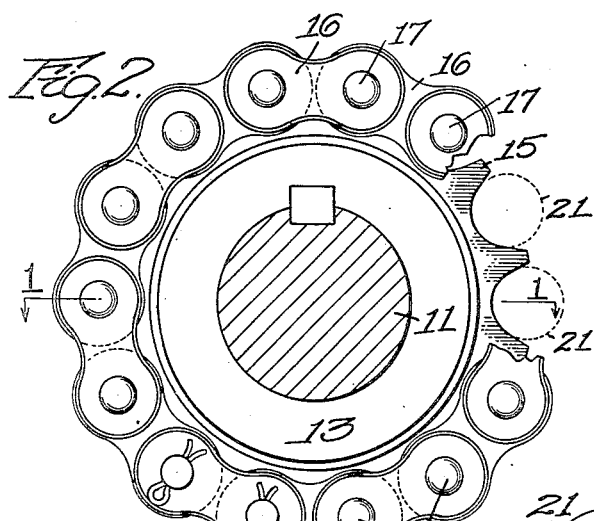
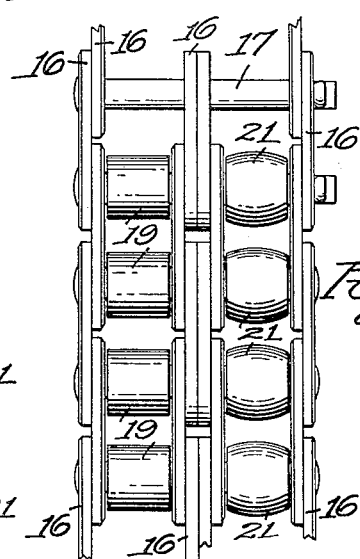
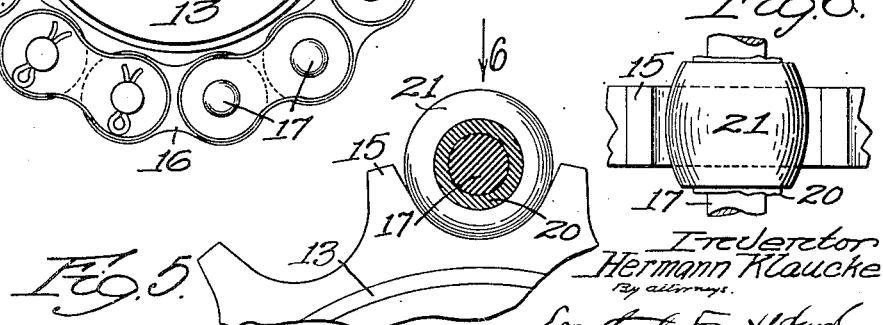
Inventor
Hermann Klaucke Patented July 3, 1934

1,965,145

UNITED STATES PATENT OFFICE 1,965,145

FLEXIBLE COUPLING

Hermann Klaucke, Worcester, Mass., assignor to Baldwin - Duckworth Chain Corporation, Worcester, Mass., a corporation of Massachusetts Application April 4, 1934, Serial No. 719,031

5 Claims. (Cl. 64—97)

The principal objects of this invention are to provide a coupling of the double chain type which, instead of being rigid, as such couplings have been made heretofore, will be flexible so that, if the two shafts are not lined up exactly correctly, the coupling will take care of it without binding, and to provide a construction of coupling of this type in which the flexibility of the coupling and the operation of the hardened parts thereof on each other will not necessitate the lubrication of the coupling and therefore will entirely eliminate the use of the casing which has been considered necessary heretofore and which adds very materially to the cost of the coupling.

Other objects and advantages of the invention will appear hereinafter.

Reference is to be had to the accompanying drawing, in which

Fig. 1 is a central sectional view on the line 1—1 of Fig. 2 of a coupling constructed in accordance with this invention;

Fig. 2 is an end elevation with the shaft in section on the line 2—2 of Fig. 1;

Fig. 3 is a side elevation of the double chain;

Fig. 4 is an end view of a portion of one of the sprockets with the chain in section;

Fig. 5 is a similar view, showing the other roller, and

Fig. 6 is a plan, as indicated by the arrow 6 in Fig. 5.

This invention relates to a well known type of so-called flexible coupling, which is composed of a pair of sprockets fixed to the ends of the two shafts to be coupled and connected by a pair of chains fitting the sprockets and connected together. Heretofore, the flexibility has been secured by leaving a little space between the sprocket teeth and the outer chain links all around so that the shafts could be a little out of alignment and still be properly coupled together but this involves friction so as to necessitate lubrication of the sprocket teeth or chains.

Furthermore, in order to prevent the oil from being thrown off the shafts while they are operating, a casing has to be provided around the coupling in most cases. This casing adds very materially to the cost of the coupling, sometimes practically doubling it.

In accordance with this invention, one of the chains is materially changed and the teeth on the sprocket wheel engaging it are so constructed as to permit of real flexibility without the production of friction. This adds very little to the expense and eliminates the necessity of lubrication and the casing, as well as providing a truly flexible coupling.

The invention is shown in a simple form in which two shafts 10 and 11 are coupled together in a general way according to the manner above described. Pinned or otherwise secured to the shafts are sprockets 12 and 13 respectively, the teeth 14 of the sprocket 12 being of the normal width for such a coupling and the teeth 15 of the sprocket 13 being of a narrower width.

The double chain comprises four series of links 16 connected together by cross pins 17 extending through them. On the chain which cooperates with the teeth 14 bushings 18 are provided about the pins and on these bushings are cylindrical rollers 19. This chain is exactly the same as the chains heretofore in use and it cooperates with the teeth 14 in the same way. The other chain is provided with similar sleeves 20 and with freely rotating rollers 21 which are wider than the teeth 15 so as to allow considerable clearance at each side and are convexed or barrel-shaped.

It will be seen that while the old coupling is clearly not flexible in the true sense of the word, this coupling is flexible and that flexibility is attained by the barrel shape of the rollers and the reduced width of the teeth 15.

It will be seen that, if the shaft 11, for example, is turned at an angle, such as indicated in the lower central line in Fig. 1, the tooth 15 on the lower side can slide along the convex surface of the roller 21 in one direction while the opposite tooth can slide along the opposite roller in the opposite direction without increasing the friction or binding the parts as would be the case with the old construction. The rollers, being mounted to turn with absolute freedom, friction is not produced by the disalignment of the shafts, but we have an anti-friction contact.

In the old form, the teeth on the two sprockets are formed at their ends. When the shafts are out of alignment these teeth will contact with each other at one side of the structure and produce a large amount of friction and heat and they will be out of contact with each other at the opposite side but will bear on the links of the chains at their outer sides and provide friction at that point. This is all done away with by the present construction.

The teeth 14 and 15 are not formed as heretofore on the extreme ends of the sprockets where they will bear on each other, if the shafts are out of alignment, but are spaced from the ends and never can come into contact with each other. In the space between the two sets of teeth are two sets of chain links or, in some instances, one chain link could be employed in the central position.

It will be seen therefore, that this coupling is flexible in a true sense and there is no possibility of the coupling binding or exerting friction at two points in the so-called flexible coupling. Therefore, there is no need of lubrication and no need of going to the expense of placing a casing around the coupling.

Having thus described my invention and the advantages thereof, I do not wish to be limited to the details herein disclosed, otherwise than as set forth in the claims, but what I claim is:—

1. As an article of manufacture, a flexible coupling comprising a pair of sprockets and a pair of chains fitting around said sprockets and provided with pins positively connecting the chains together, said chains having rollers for engaging the teeth of the sprockets, the rollers on one chain being longitudinally convex.

2. As an article of manufacture, a flexible chain coupling comprising a pair of sprockets adapted to be attached to the two shafts to be connected, a pair of chains fitting the teeth of the two sprockets, pins connecting the links of said chains, and rollers on said chains around said pins, the rollers on one chain being cylindrical and the rollers on the other chain being barrel-shaped.

3. As an article of manufacture, a flexible coupling comprising a pair of sprocket wheels fixed to the two shafts to be coupled, each sprocket wheel having a set of teeth surrounding it spaced apart, a pair of complete chains surrounding the two sets of sprocket teeth, rollers on the two chains, pins passing through the rollers on each chain to fasten the chains together, the inner links of the two chains separating the two sets of rollers a material distance apart so that the sprocket teeth will not come into contact with each other.

4. As an article of manufacture, a flexible coupling comprising a pair of sprocket wheels, each having teeth, a pair of chains passing around the teeth of the two sprocket wheels, pins for holding the chains together and the ends of the sprocket wheels spaced apart, said chains comprising chain links located at the center of said pins and anti-friction rollers on the pins separated by said chains, one set of rollers being longitudinally convex.

5. In a coupling, the combination with two sprocket wheels, each having a circumferential row of teeth, the teeth on one sprocket wheel being narrower than on the other and the two sets of teeth being spaced apart, and a chain structure surrounding each sprocket wheel and comprising two sets of freely rotatable rollers, the rollers engaging the narrow teeth being convex to allow for the disalignment of the shafts.

HERMANN KLAUCKE.